(12) United States Patent
Kiontke (10) Patent No.: US 9,457,411 B2
(45) Date of Patent: Oct. 4, 2016

(54) COLLET

(75) Inventor: Sven Kiontke, Jena (DE)

(73) Assignee: Asphericon GmbH, Jena (DE)

( * ) Notice: Subject to any disclaimer, the term of this patent is extended or adjusted under 35 U.S.C. 154(b) by 164 days.

(21) Appl. No.: 13/399,431

(22) Filed: Feb. 17, 2012

(65) Prior Publication Data

US 2013/0214494 A1   Aug. 22, 2013

(51) Int. Cl.
  *B23B 31/20* (2006.01)
  *B24B 13/005* (2006.01)

(52) U.S. Cl.
  CPC .......... *B23B 31/208* (2013.01); *B23B 31/202* (2013.01); *B24B 13/005* (2013.01); *B23B 2231/201* (2013.01); *Y10T 279/17324* (2015.01); *Y10T 279/17427* (2015.01)

(58) Field of Classification Search
  CPC ... B23B 31/202; B23B 31/208; B23B 31/20; B23B 31/005; Y10T 279/17324; Y10T 279/17427
  USPC ...... 279/43.2, 46.3; 451/365, 378, 379, 384, 451/390; 359/819
  See application file for complete search history.

(56) References Cited

U.S. PATENT DOCUMENTS

| | | | | |
|---|---|---|---|---|
| 2,061,321 A * | 11/1936 | Knott | ................. | B23B 31/202 279/102 |
| 2,224,168 A * | 12/1940 | Tillyer et al. | ................. | 451/390 |
| 2,428,375 A * | 10/1947 | Massierer | ................. | 279/56 |
| 2,578,642 A | 12/1951 | Dodge | | |
| 2,688,220 A * | 9/1954 | Boutell | ................. | B24B 13/005 451/388 |
| 3,050,314 A * | 8/1962 | Uebelacker | ................. | 279/46.3 |
| 3,152,810 A * | 10/1964 | Brinkman | ................. | 279/46.3 |
| 3,837,661 A * | 9/1974 | Phillippi | ................. | 279/131 |
| 4,258,982 A * | 3/1981 | Skinner et al. | ................. | 359/819 |
| 4,512,072 A * | 4/1985 | Graham | ................. | 29/252 |
| 4,856,234 A * | 8/1989 | Goins | ................. | 451/42 |
| 5,119,595 A | 6/1992 | Ushiyama et al. | | |
| 5,277,435 A * | 1/1994 | Kramer et al. | ................. | 279/9.1 |
| 5,284,348 A * | 2/1994 | Tanaka et al. | ................. | 279/43.7 |
| 5,357,716 A * | 10/1994 | Kishida et al. | ................. | 451/390 |
| 5,525,096 A | 6/1996 | Mayahara et al. | | |
| 5,556,550 A * | 9/1996 | Fyffe | ................. | 219/75 |
| 5,941,647 A * | 8/1999 | Koike et al. | ................. | 384/296 |
| 5,951,375 A | 9/1999 | Mandler | | |
| 6,554,288 B2 * | 4/2003 | Tomoni | ................. | 279/51 |

(Continued)

FOREIGN PATENT DOCUMENTS

DE   1 754 274 U   10/1957
DE   1 968 912 U   9/1967

(Continued)

OTHER PUBLICATIONS

English translations of Japan patent JP58181557A issued to Yoshimasa, by USPTO, Dec. 2013.*

(Continued)

*Primary Examiner* — Eric A Gates
*Assistant Examiner* — Chwen-Wei Su
(74) *Attorney, Agent, or Firm* — Muncy, Geissler, Olds & Lowe, P.C.

(57) ABSTRACT

A collet for holding a lens includes a shank and at least two gripping jaws separated from one another by radial slots, wherein a shape of an upper edge region of the gripping jaws is designed as a radial continuation of a region to be processed of the lens that is to be held by the collet.

17 Claims, 8 Drawing Sheets

(56) References Cited

U.S. PATENT DOCUMENTS

| | | | |
|---|---|---|---|
| 6,733,369 B1 * | 5/2004 | Stacklies et al. | 451/42 |
| 6,855,036 B1 | 2/2005 | Arserio et al. | |
| 2005/0020186 A1 | 1/2005 | Schneider et al. | |
| 2005/0075060 A1 | 4/2005 | Bergandy et al. | |
| 2006/0017238 A1 | 1/2006 | Bergandy et al. | |
| 2010/0201084 A1 | 8/2010 | Mandarello | |

FOREIGN PATENT DOCUMENTS

| | | |
|---|---|---|
| DE | 86 01 499 | 4/1986 |
| DE | 40 21 722 C2 | 1/1991 |
| DE | 296 08 877 U1 | 8/1996 |
| DE | 100 53 230 A1 | 5/2002 |
| DE | 103 10 561 B4 | 10/2004 |
| DE | 103 15 008 A1 | 1/2005 |
| DE | 103 32 673 A1 | 2/2005 |
| DE | 10 2011 002 871 A1 | 7/2012 |
| EP | 1 049 555 B1 | 11/2000 |
| FR | 1 278 600 | 12/1961 |
| GB | 1 155 719 | 6/1969 |
| JP | S57-23956 U | 2/1982 |
| JP | 58-181557 | 10/1983 |
| JP | S 59-173546 U | 1/1984 |
| JP | H 01-170548 U | 12/1989 |
| JP | H 03-43145 A | 2/1991 |
| JP | H 04-23213 U | 2/1992 |
| JP | H 04-105865 A | 4/1992 |
| JP | H 04-250963 A | 9/1992 |
| JP | 5-084605 | 4/1993 |
| JP | H 09-85604 A | 3/1997 |
| JP | H 09-225769 A | 9/1997 |
| JP | 10225809 A | 8/1998 |
| JP | 11019858 A | 1/1999 |
| JP | 2000-079547 A | 3/2000 |
| JP | 2000-246522 A | 9/2000 |
| WO | WO 03/033205 A1 | 4/2003 |
| WO | WO 2009/018965 A1 | 2/2009 |
| WO | WO 2011/076904 A1 | 6/2011 |

OTHER PUBLICATIONS

Japanese Office Action for Japanese Application No. 2012-055952 dated Jun. 5, 2013 with English translation.
Japanese Office Action for Japanese Application No. 2012-055952 dated Oct. 30, 2013 with English translation.

* cited by examiner

COLLET

The invention concerns a collet according to the features of the preamble of claim 1.

Known from the prior art, as described in EP 1 049 555 B1, is a collet for holding rod stock in lathes. The clamp includes multiple loose jaw elements, sector-shaped in cross-section, which together form an essentially tubular body, each of which has a partial truncated conical surface on its outside and is provided on one end with an actuating formation, wherein the jaw elements are held together at the perimeter and are spaced apart from one another by spring bodies arranged between them. Provided in the vicinity of the partial truncated conical surface of each jaw element is at least one small support surface projecting therefrom as a force-transmitting adjustment formation for radial adjustment of the jaw elements in their operating position.

DE 1 754 274 U describes a collet for machining wheel disks for precision mechanics purposes. Fastened by screws and dowel pins to the clamping part of the collet, which is provided with radial slots, are replaceable and interchangeable segments made of steel or brass that have been bored to the requisite clamping diameter.

From DE 1 968 912 U is known a collet with a tool stop apparatus for accommodating and clamping tools with cylindrical shanks, in particular milling cutters with threaded shanks. The threaded receptacle for the machine spindle extends into the slotted part of the collet and accommodates an axially adjustable lock screw ahead of the machine spindle.

WO 2009/018965 A1 describes a clamping apparatus and an arrangement of such a clamping apparatus with a collet. A chuck for accommodating a multi-part collet for clamping a workpiece has a housing with a collet receptacle with guide apparatus and guide surfaces. The collet is movable on the chuck in the axial direction. The guide apparatus has balls as rollers on the guide surfaces, a plurality of which are arranged contiguously on a roller retainer. Together with the retainer, the balls can move in the guide apparatus from an initial position into the chuck. A return device for the roller retainer is provided with a direction of action out of the chuck in order to move the balls back to the initial position when no collet is present in the chuck.

A collet system for use in lens production is known from US 2006/0017238 A1. The collet system holds a workpiece for processing in a machine. It includes a collet body with a workpiece opening for holding the workpiece with a predefined pressure.

Collet systems for lenses are also known from JP 10225809 A and JP 11019858 A.

DE 103 15 008 A1 and DE 103 32 673 A1 describe a method and a device for producing eyeglass lenses and other molded articles with optically active surfaces. Here, semi-finished parts produced by non-cutting shaping methods are used. Mechanical production steps are carried out subsequently. Semifinished parts are used on which, among other features, a shaped edge is formed by non-cutting means. The shaped edge is used for clamping in the processing machines that cut. The edge remains intact during all further processing operations and is used for clamping or removing the workpiece, and also for supporting the actual eyeglass lens or the molded article during further processing. The eyeglass lens is separated from the shaped edge at the end of processing.

Known from WO 03/033205 A1 are a device and a method for complete processing of lenses that are optically active on two sides. The device comprises a cutting unit, a milling unit, and/or a polishing unit for processing at least a first side of the lens, wherein a re-clamping unit is provided for re-clamping the lens for the purpose of processing a second side of the lens.

DE 100 53 230 A1 describes a chuck for a device for polishing lenses and a device with such a chuck. The chuck is designed such that an elastic resilience is present between a closer and a spindle head. This is produced by an air cushion formed between a clamping piston and a pushrod.

Known from DE 103 10 561 B4 are a method and a device for manufacturing eyeglass lenses and other molded articles with optically active surfaces. In the method, plastic blanks, which have the form of flat, round disks, are chucked at their outer edge. A convex lens front and/or a concave lens back are processed in a cutting manner with milling and/or turning tools as well as by grinding, precision grinding and, if applicable, polishing. In this process, an annular region of relatively large thickness is preserved at the outer circumference of the workpiece, and is used for clamping and/or removing the workpiece, and also for supporting and stabilizing the molded article and/or the actual eyeglass lens during processing and transport operations, and is ultimately removed. The annular region contains markings and/or shapings for identifying the processing axes. Fine markings are applied to the surface of the molded article or the actual eyeglass lens that identify the axis position of the surface geometries produced. During milling of the convex lens front, a circular groove is produced in the edge region of the workpiece that has a radius in cross-section corresponding at least to that of the milling cutter of the milling machine. Toward the outside the groove transitions to the annular region, and toward the inside to the eyeglass lens.

DE 40 21 722 C2 describes a grinding apparatus. The grinding apparatus comprises a holder for a workpiece and an electrically conductive grinding means that is positioned opposite the workpiece holder and can be brought into contact with the surface of a workpiece. A relative rotary motion between the workpiece and the grinding means is possible. An electrode is positioned such that a gap of predetermined size is formed between the grinding surface of the grinding means and the electrode during operation with no advance. A DC voltage source is provided whose negative terminal is connected to the electrode and whose positive terminal is connected to the grinding means. In addition, a device is provided that delivers a weakly electrically conductive cooling fluid into the intermediate space between the grinding means and electrode.

A lens holder is known from GB 1,155,719. This holder has a section with a recess that is surrounded by a wall. The wall subjects an edge or regions of the edge of a lens held by the lens holder to a pressing force that results, at least in part, from an elasticity of the section of the lens holder. The section of the lens holder has a radial slot that extends inward through the wall from an outside of the section, so that the section of the lens holder has to be spread apart in order to thereby enlarge the recess for insertion or removal of a lens.

In DE 296 08 877 U1, a holder for optical lenses is known. The holder comprises a cylindrical base body, an elastic lens support surface retained thereon, and a central passage passing axially through the base body. The base body is designed as a dressing tool.

The object of the invention is to specify an improved collet.

The object is attained according to the invention by a collet with the features of claim 1.

Advantageous embodiments of the invention are the subject matter of the dependent claims.

A collet for holding a lens comprises a shank and at least two gripping jaws separated from one another by radial slots. According to the invention, a shape of an upper edge region of the gripping jaws, which forms a contact surface for an at least partially flexible grinding or polishing tool, is designed as a radial continuation of a region to be processed of the lens that is to be held by the collet.

In an embodiment according to the invention, a distance from an annular contact surface for the lens at a bottom outer edge of a receiving space for the lens formed by the gripping jaws to the upper edge region corresponds to a thickness of the lens at its edge, or is less than the thickness of the lens by an amount that corresponds to a material removal during the grinding and/or polishing that follows chucking in the collet, or corresponds to the material removal during the grinding and/or polishing that follows chucking in the collet and an additional center thickness tolerance.

A back of the lens rests on the annular contact surface at a bottom outer edge of a receiving space for the lens formed by the gripping jaws, so that the lens is held flat in the collet. In useful manner in this design, the contact surface is designed to correspond in such a manner to a region of the back of the lens resting on the contact surface that the flat retention of the lens in the collet is ensured. The lens is held centered in the collet by means of an inner lateral bearing surface of the gripping jaws with which the gripping jaws laterally contact the lens. An inner region that is surrounded by the annular contact surface is designed to be lower than the contact surface so that the lens does not touch the collet in this region. In this way, damage to the lens by the collet is avoided, especially in a central, optically active area. Moreover, dirt particles, such as grinding or polishing residues from preceding lens processing steps, can escape into this lower region so that they do not contaminate the contact surface and thereby impair an optimized, flat resting of the lens on the contact surface, and do not damage the lens.

According to the invention, a distance between the contact surface for the lens and the upper edge region of the gripping jaws corresponds to the thickness of the lens at its edge, or is slightly smaller. This applies to the thickness of the lens chucked in the collet prior to its processing by grinding and/or polishing that follows the chucking. In this way, a seamless transition from the region of the lens to be processed to the upper edge region of the gripping jaws is made possible. This avoids a deformation of the grinding or polishing tool at the transition from the region of the lens to be processed to the upper edge region of the gripping jaws, which would lead to errors in processing the lens.

In this regard, in a first alternative the distance is less than the thickness of the lens by an amount that corresponds to a material removal during the grinding and/or polishing that follows the chucking in the collet. In other words, before the processing of the lens, the edge of the lens chucked in the collet is slightly higher than the adjacent edge of the upper edge region of the gripping jaws. After processing of the lens, which is to say after the removal of material by the grinding and/or polishing of the lens has taken place, the edge of the lens and the adjacent edge of the upper edge region of the gripping jaws are then at the same height.

In a second alternative the distance is less than the thickness of the lens by an amount that corresponds to the material removal during the grinding and/or polishing that follows the chucking in the collet and an additional center thickness tolerance, since the thickness of the lenses is not identical, but can exhibit tolerances, i.e. these center thickness tolerances. In addition, this also permits, e.g., an additional processing step, for example a second polishing, in the event that a defect has arisen during the first processing step.

In an alternative embodiment according to the invention, a lens support is formed that is centered in a receiving space for the lens formed by the gripping jaws. This embodiment is suitable for lenses having a concave back opposite the region to be processed, for example, and permits an alternative support and flat retention of the lens in the collet. The annular contact surface at the edge is thus not absolutely necessary in this embodiment. According to the invention, a bearing surface of the lens support is designed to be rounded in order to avoid damage to the lens resting against it. In useful manner, the lens support or its bearing surface is designed to correspond to a region of the back of the lens resting on the contact surface such that the flat retention of the lens in the collet is ensured. In this embodiment of the collet, the lens is held centered by the inner lateral bearing surfaces of the gripping jaws with which the gripping jaws laterally contact the lens, and is supported and held flat in the collet by the lens support.

The collet, which can also have three or six gripping jaws for example, permits simple and rapid chucking of the lens in order to hold it for subsequent processing, in particular for grinding and/or polishing. To this end, the lens is to be placed in the collet, and the shank of the collet is to be chucked in, e.g., a hydraulic expansion chuck, by which means the gripping jaws rest against the lens.

The lens is held and centered with high precision in the collet, so that highly precise grinding and/or polishing of the lens is made possible. In other words, the lens is held both flat and centered in the collet. An error in axial runout or radial runout of the lens held in the collet is less than 5 μm, for example; it is typically in the range of 2 μm.

The upper edge region, which is shaped corresponding to the region of the lens to be processed, forms a contact surface for the grinding or polishing tool, which is at least partially flexible and thus adapts to a shape of the region to be processed, which is to say a surface of the lens. In edge regions of the lens, the grinding or polishing tool then rests partially on the upper edge region of the gripping jaws, which in practice forms a radial extension of the surface of the lens to be processed. As a result, the grinding or polishing tool continues to retain the shape adapted to the surface of the lens, and does not deviate at the outer edge of the lens. In this way, processing errors in the lens resulting from a grinding or polishing tool deforming at the outer edge of the lens are prevented, and uniform and highly precise grinding or polishing of the lens over its entire surface including the edge region of the lens is made possible. As a result, for example, a subsequent separation of the side edge region of the lens, which cannot be optimally processed by means of devices according to the prior art, can be avoided, so that a lens material can be used optimally and a processing time is reduced.

In devices according to the prior art, the lenses have a larger diameter than is required for the finished lens. They have to be manually glued to a lens holder and centered. After grinding and/or polishing, the edge region has to be removed, which is to say that the lens has to be centered in order to bring it to its final diameter. This requires a greater expenditure of material and processing time and the resultant higher costs.

In contrast, in the collet the lens is to be chucked at its final diameter. Centering of the lens in the collet is accomplished automatically by the closing of the gripping jaws. In this way, the labor-intensive manual gluing of the lens to the holder and centering on this holder, as well as the subsequent centering of the lens, which is to say the removal of the edge region, are eliminated.

The collet is especially suited for holding aspheric lenses and lenses with an aspheric region that is to be processed, which is to say to be ground and/or polished.

After processing of the lens is complete, the collet is to be removed from the hydraulic expansion chuck, the lens is to be removed from the collet, and another lens to be processed is to be chucked in the same manner with high precision. This represents a considerable simplification of work and a reduction in processing time, especially in comparison with lens processing according to the prior art, in which manual gluing to a holder of the lens to be processed and subsequent alignment are required. It is also possible merely to open the hydraulic expansion chuck, by which means the gripping jaws of the collet also open, and to leave the collet in the hydraulic expansion chuck. The lens should then be picked up by a vacuum tool, for example, and removed from the collet. Another lens to be processed can then be chucked in the collet, and the hydraulic expansion chuck, and thus the gripping jaws of the collet, should be closed again. In this way, the removal of the collet from the hydraulic expansion chuck and reinsertion in the hydraulic expansion chuck are eliminated.

In useful fashion, the upper edge region is formed with an aspheric, conical, or spherical shape depending on the lens to be processed in order to permit an extension of the shape of the region to be processed to the upper edge region of gripping jaws.

In useful fashion, the collet is made of metal, especially steel, preferably hardened steel. In this way the collet has good clamping, so that a large number of lenses can be optimally chucked, retained, and processed. Furthermore, the collet has great toughness and low wear during polishing, so that high precision is possible in chucking the lenses and processing the lenses even after a large number of lenses have been processed, which is to say that a long service life of the collet is made possible. In particular, as a result of the foregoing a wear of the upper edge region by the grinding or polishing tool is very small, so that the upper edge region of the gripping jaws is still shaped as the radial extension of the region to be processed of the lenses held by the collet even after a large number of lenses have been held and processed using the collet.

Preferably, a wall thickness of the shank is made thinner below the radial slots, which is to say at the bottom end of the shank, than in the region of the radial slots. This provides an exact pivot point for the gripping jaws, about which they pivot when pressed together by, e.g., the hydraulic expansion chuck, and thereby approach one another, closing the collet and chucking the lens. Due to the thicker formation of the upper region of the shank, i.e. in the region of the radial slots, deformation of the shank during chucking, and thus uneven or inadequate chucking by the collet, is avoided.

Preferably, the shank has a shank recess in the form of a groove on an outer surface in the transition region to the gripping jaws. In useful fashion, the gripping jaws also have a gripping jaw recess in the form of a groove on an outer surface in the transition region to the shank, i.e., on an underside. The two recesses in the form of grooves preferably are connected to form a circumferential recess. This recess permits, or the shank recess and gripping jaw recess permit, optimal insertion of the collet in the hydraulic expansion chuck, wherein the collet optimally rests against the hydraulic expansion chuck with both the shank and the underside of the gripping jaws, and is not hindered by the possible presence of dirt particles, for example grinding or polishing residues from previous lens processing. These dirt particles can escape into the recess, and do not hinder the insertion of the collet in the hydraulic expansion chuck. In this way, exact clamping of the collet, and thereby exact chucking of the lens in the collet, are made possible.

Exemplary embodiments of the invention are explained in detail below using drawings.

Shown in the drawings are.

Parts that correspond to one another are labeled with the same reference symbols in all the figures.

Figure 13:
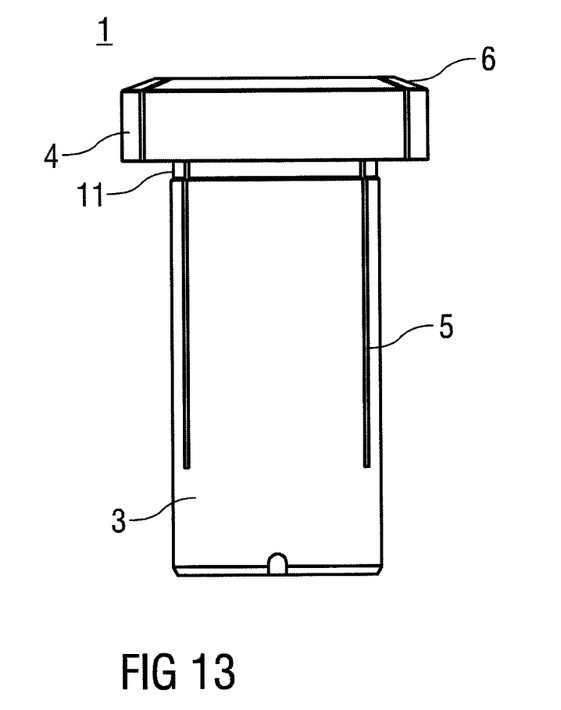
Figure 14:
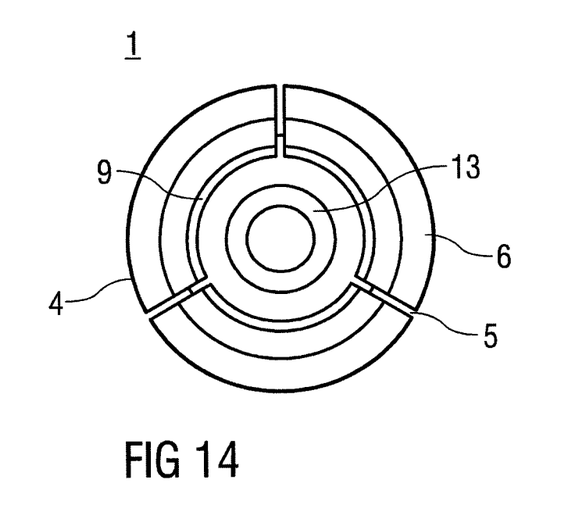
Figure 15:
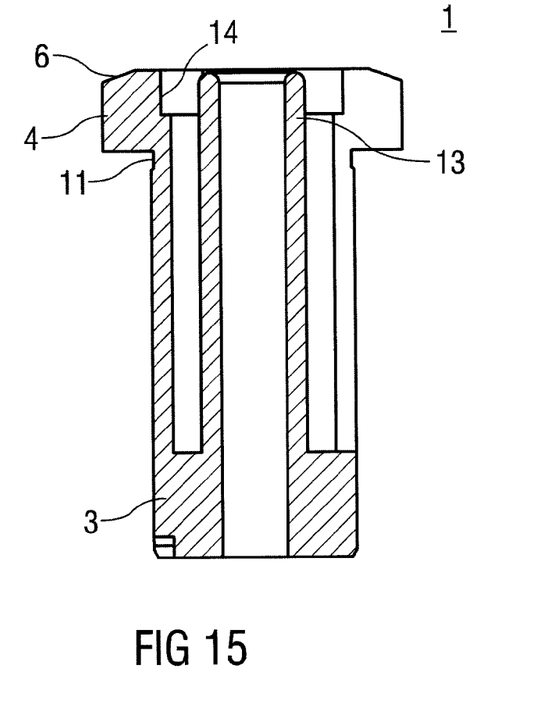
Figure 16:
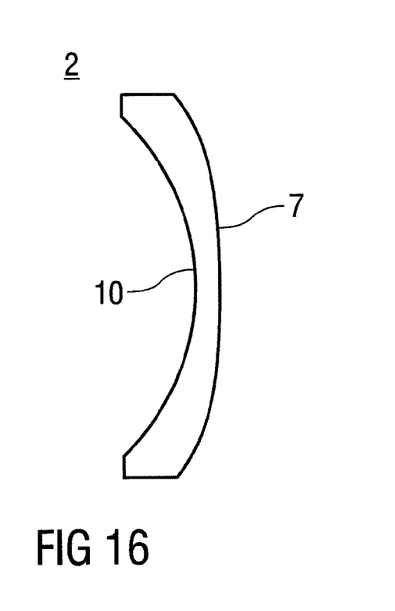

FIGS. 1 through 6 show a first exemplary embodiment, FIGS. 7 through 12 show a second exemplary embodiment, and FIGS. 13 through 15 show a third exemplary embodiment of a collet 1 for holding lenses 2 in order to process them, for example to grind and/or polish them. FIG. 16 shows an example of a lens 2 to be held by means of the collet 1, in particular by means of the third embodiment of the collet 1.

The collet 1 comprises a shank 3 and a plurality of gripping jaws 4, namely three gripping jaws 4 in the first and third embodiments, and six gripping jaws 4 in the second embodiment. Of course, other embodiments of collets 1 with a different number of gripping jaws 4 are also possible.

The gripping jaws 4 are separated from one another by radial slots 5, and form a round receiving space for holding round lenses 2. The radial slots 5 extend to a lower region of the shank 3, in other words the shank 3 is formed from multiple shank parts that are connected to one another only at a lower end of the shank 3, are separated from one another further along the shank by the radial slots 5, and on which the gripping jaws 4 are arranged at an upper end of the shank 3.

One form of an upper edge region 6 of the gripping jaws 4 is shaped as a radial extension of a region 7 to be processed of the lens 2 to be held by the collet 1, for example aspheric, conical, or spherical. In this design, the collet 1 first can be produced in a rough form, for example, and subsequently can be shaped to its final form, in the machine tools for the lenses 2, for example. To this end, the upper edge region 6 is to be ground using a cubic boron nitride grinding disk, and thereby adapted to the required form that corresponds to the radial extension of the region 7 to be processed of the lens 2 to be held by the collet 1.

Figure 10:
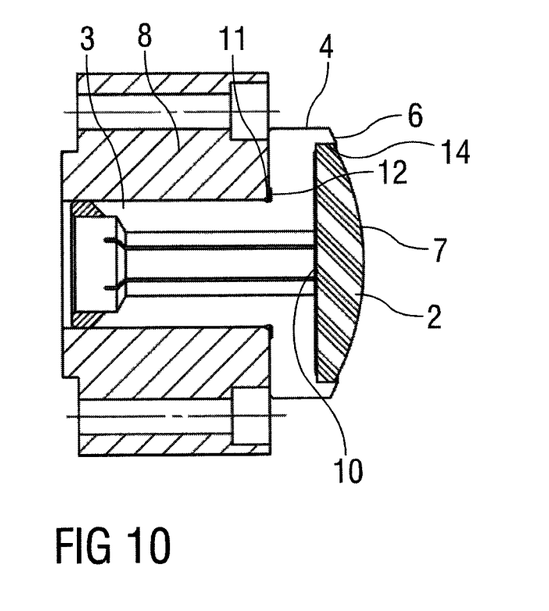

As shown by way of example in FIG. 10, the collet 1 permits simple and rapid chucking of the lens 2 in order to hold it for subsequent processing, especially for grinding and/or polishing. In this design, the collet 1 is especially suited to the production of aspheric lenses 2, which is to say that at least the region 7 to be processed, e.g., ground and/or polished, of the lens 2 is aspheric or is to be made aspheric by grinding and/or polishing of the lens 2 retained in the collet 1.

To chuck and retain the lens 2, the lens 2 is to be placed in the collet 1, in other words is placed in the round receiving space formed by the gripping jaws 4, and the collet 1 is to be chucked by the shank 3 in a hydraulic expansion chuck 8 as shown in FIG. 10, for example, or in another suitable clamping element, by which means the inner lateral bearing surfaces 14 of the gripping jaws 4 contact the lens 2 and center it in the collet. In other words, the shank 3 of the collet 1 is to be inserted in the hydraulic expansion chuck 8 until an underside of the gripping jaws 4 rests against an upper side of the hydraulic expansion chuck 8. Then the hydraulic expansion chuck 8 is to be subjected to pressure and pressed thereby against the shank 3, by which means the shank parts are pressed inward. This means that the shank parts pressed by the hydraulic expansion chuck 8 pivot toward one another about a pivot axis formed at the bottom end of the shank 3 by the shank parts joined together there, by which means the gripping jaws 4 located on the shank parts at the top end of the shank 3 also pivot toward one another. This causes chucking in the collet 1 of the lens 2 located between the gripping jaws 4. The pivot axis in this design is located in the region of a bottom end of the radial slots 5.

The lens 2 is held and centered with high precision in the collet 1, so that highly precise grinding and/or polishing of the lens 2 is made possible. In other words, the lens 2 is held both flat and centered in the collet 1. An error in axial runout or radial runout of the lens 2 held in the collet 1 is less than 5 μm, for example; it is typically in the range of 2 μm.

The upper edge region 6, which is shaped corresponding to the region 7 of the lens 2 to be processed, forms a contact surface for the grinding or polishing tool, which is at least partially flexible and thus adapts to a shape of the region 7 to be processed, which is to say a surface of the lens 2 to be processed. In edge regions of the lens 2, the grinding or polishing tool then rests partially on the upper edge region 6 of the gripping jaws 4, which in practice forms a radial extension of the surface of the lens 2. As a result, the grinding or polishing tool continues to retain the shape adapted to the surface of the lens 2, and does not deviate at the outer edge of the lens 2.

In this way, processing errors in the lens 2 resulting from a grinding or polishing tool deforming across the outer edge of the lens 2 are prevented, and uniform and highly precise grinding or polishing of the lens 2 over its entire surface including the edge region of the lens 2 is made possible, which is to say over the entire region 7 to be processed of the lens 2. In this way, for example, a subsequent separation of the side edge region of the lens 2, which cannot be optimally processed by means of devices according to the prior art, can be avoided, so that a lens material can be used optimally and a processing time is reduced.

In devices according to the prior art, the lenses have a larger diameter than is required for the finished lens. They have to be manually glued to a lens holder and centered. After grinding and/or polishing, the edge region has to be removed, which is to say that the lens has to be centered in order to bring it to its final diameter. This requires a greater expenditure of material and processing time and the resultant higher costs.

In contrast, in the collet 1 the lens is to be chucked at its final diameter. Centering of the lens 2 in the collet 1 is accomplished automatically by the closing of the gripping jaws 4. In this way, the labor-intensive manual gluing of the lens 2 to the holder and centering on this holder, as well as the subsequent centering of the lens 2, which is to say the removal of the edge region of the lens 2, are eliminated.

After processing of the lens 2 is complete, the collet 1 is to be removed from the hydraulic expansion chuck 8, the lens 2 is to be removed from the collet 1, and another lens 2 to be processed is to be chucked in the same manner with high precision and subsequently processed. This represents a considerable simplification of work and a reduction in processing time, especially in comparison with lens processing according to the prior art, in which manual gluing to a holder of the lens 2 to be processed and subsequent alignment are required.

It is also possible merely to open the hydraulic expansion chuck 8, by which means the gripping jaws 4 of the collet 1 also open, and to leave the collet 1 in the hydraulic expansion chuck 8. The lens 2 should then be picked up by a vacuum tool, for example, and removed from the collet 1. Another lens 2 to be processed can then be chucked in the collet 1, and the hydraulic expansion chuck 8, and thus the gripping jaws 4, should be closed again. In this way, the removal of the collet 1 from the hydraulic expansion chuck 8 and reinsertion in the hydraulic expansion chuck 8 are eliminated.

The collet 1 is advantageously made of hardened steel. It is usefully made as a single piece. Because of the hardened steel, the collet 1 has good clamping, so that a large number of lenses 2 can be optimally chucked, retained, and processed. Furthermore, the collet 1 has great toughness and low wear during polishing, so that high precision is possible in chucking the lenses 2 and during processing the lenses 2 even after a large number of lenses 2 have been processed, which is to say that a long service life of the collet 1 is made possible.

In particular, a wear of the upper edge region 6 of the gripping jaws 4 by the grinding or polishing tool used for processing the lenses 2 is very small on account of the hardened steel, so that the upper edge region 6 is still shaped as a radial extension of the region 7 to be processed of the lenses 2 held by the collet 1 even after a large number of lenses 2 have been held and processed using the collet 1, and thus provides a good support for the grinding or polishing tool during grinding or polishing, especially of edge regions of the lens 2.

Figure 1:
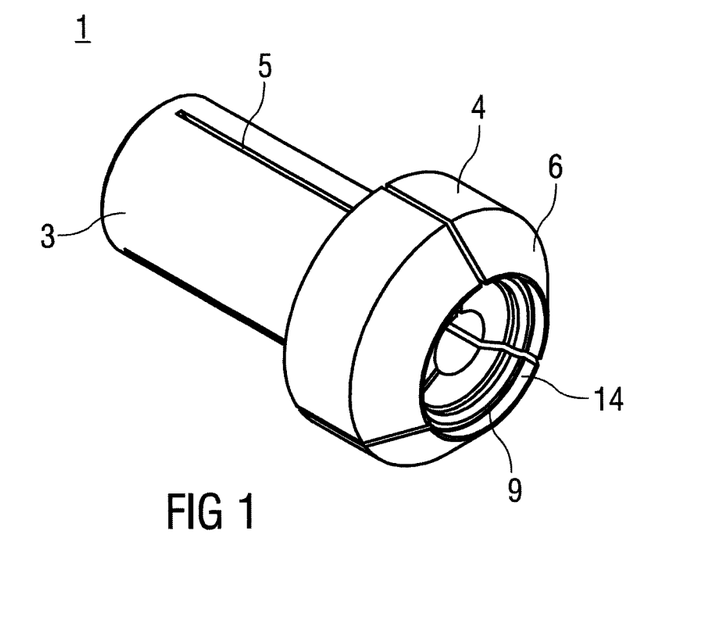
FIG. 1 a perspective view of a first embodiment of a collet.
Figure 2:
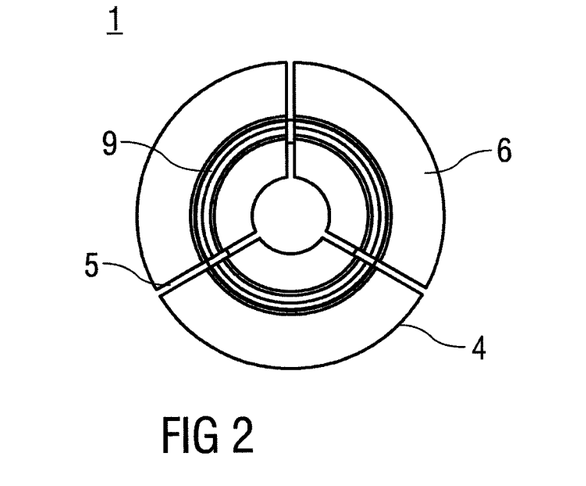
FIG. 2 a first embodiment of a collet seen from above.
Figure 3:
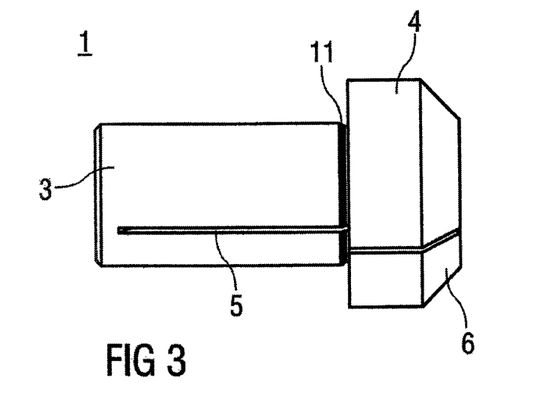
FIG. 3 a side view of a first embodiment of a collet.
Figure 4:
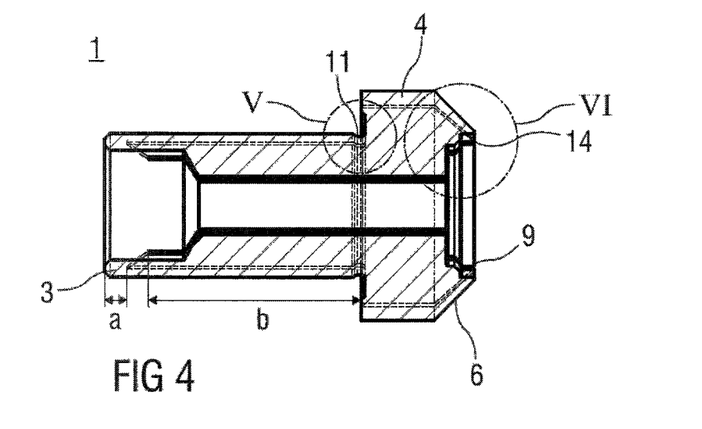
FIG. 4 a view in longitudinal cross-section of a first embodiment of a collet, FIG. 5 a first detail view from FIG. 4, FIG. 6 a second detail view from FIG. 4, FIG. 7 a perspective view of a second embodiment of a collet seen from above, FIG. 8 a perspective view of a second embodiment of a collet seen from below, FIG. 9 a second embodiment of a collet seen from above, FIG. 10 a view in longitudinal cross-section of a second embodiment of a collet with chucked lens, FIG. 11 a view in longitudinal cross-section of a second embodiment of a collet along the section line XI-XI from FIG. 9, FIG. 12 a detail view from FIG. 11, FIG. 13 a side view of a third embodiment of a collet, FIG. 14 a third embodiment of a collet seen from above, FIG. 15 a view in longitudinal cross-section of a third embodiment of a collet, and FIG. 16 a cross-section of a lens to be chucked in the third embodiment of the collet.
Figure 5:
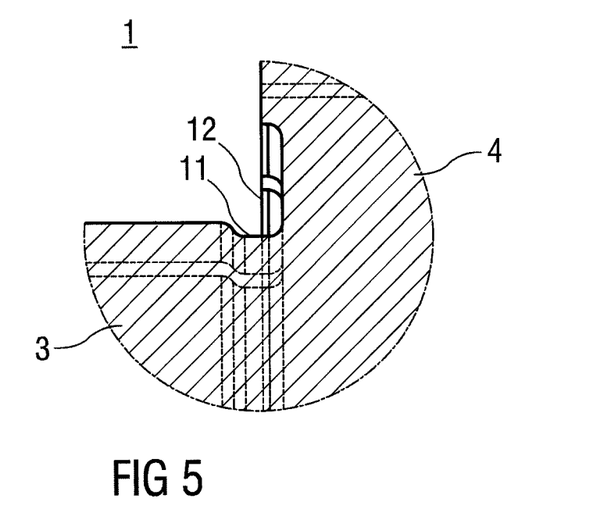
Figure 6:
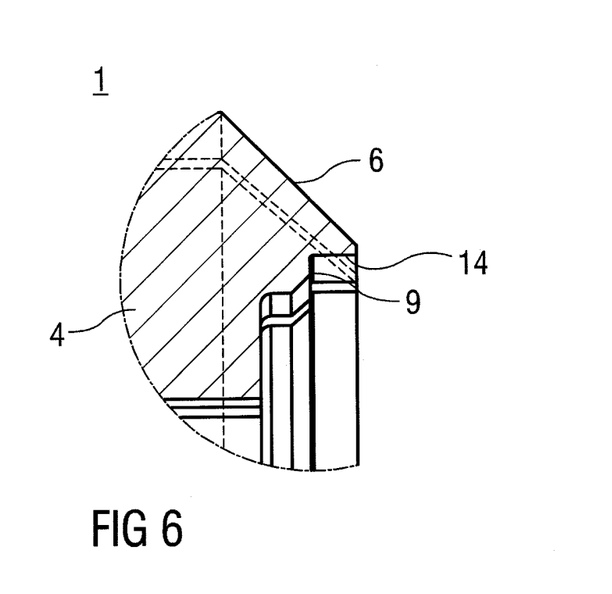
Figure 7:
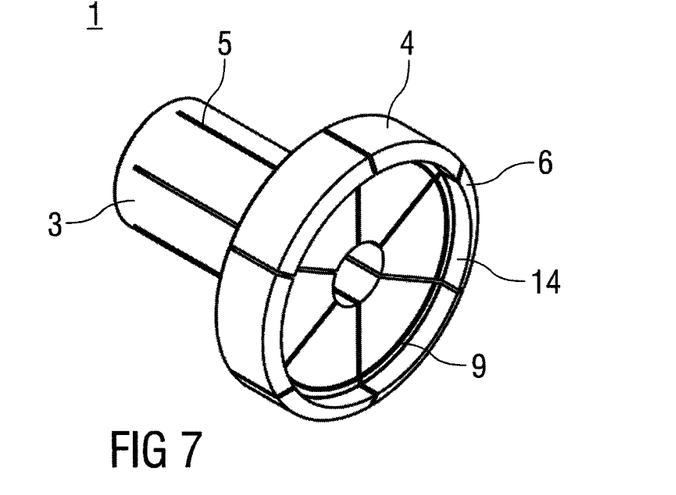
Figure 8:
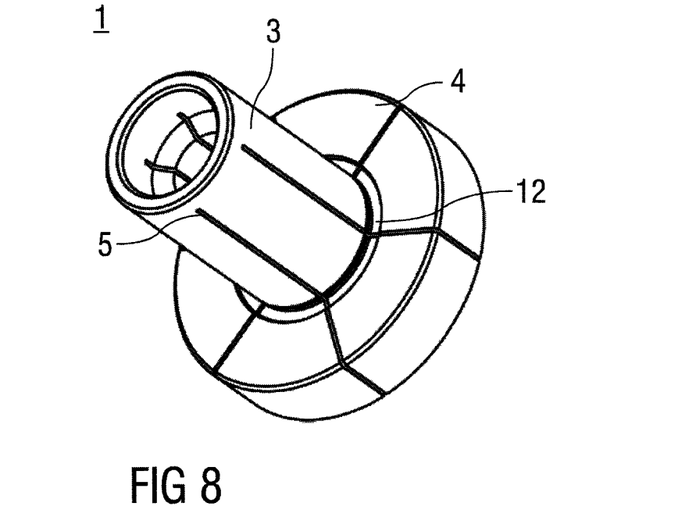
Figure 9:
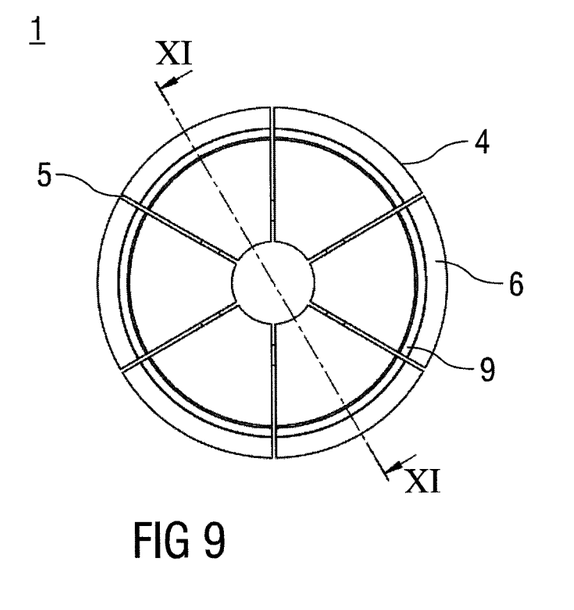
Figure 11:
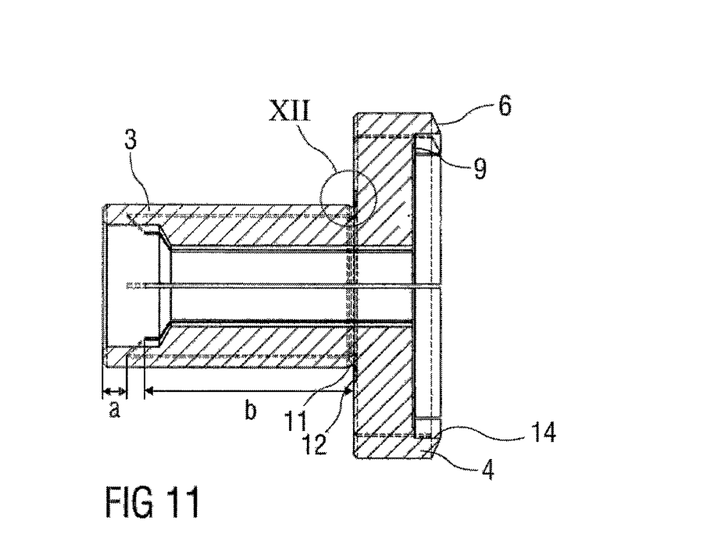
Figure 12:
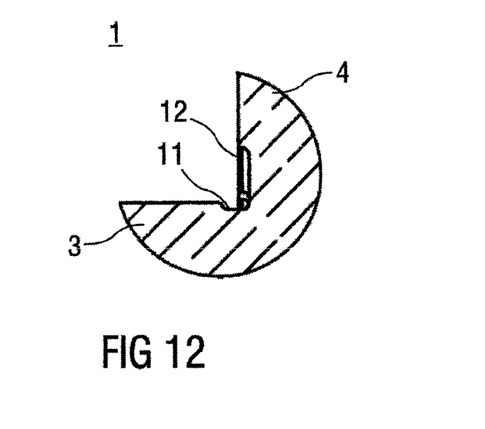

As is shown in FIGS. 4 and 11, a wall thickness of the shank 3 in the first and second exemplary embodiments is made thinner below the radial slots 5 as indicated by "a" in FIGS. 4 and 11, than in the region of the radial slots 5 as indicated by "b" in FIGS 4 and 11, which is to say that a connecting region of the shank parts at the bottom end of the shank 3 has a smaller wall thickness than the shank parts themselves that are separated by the radial slots 5. This provides an exact pivot point for the gripping jaws 4, about which they pivot when pressed together by, e.g., the hydraulic expansion chuck 8, and thereby approach one another, closing the collet 1 and chucking the lens 2. In other words, the pivot axis of the shank parts and thus the gripping jaws 4 formed at the top end of the shank parts is produced by the connecting region of the shank parts, which are otherwise separated by the radial slots 5. The pivot axis is located in the region of the bottom end of the radial slots 5. Due to the thicker formation of the upper region of the shank 3, which is to say the shank parts separated by the radial slots 5, a deformation of the shank 3 in the region of the shank parts and the gripping jaws 4 formed thereon during chucking, and thus uneven or inadequate chucking by the collet 1, is avoided.

As is evident from FIG. 10, a distance from a contact surface 9 for the lens 2 to the upper edge region 6 corresponds to a thickness of the lens 2 in this region or is slightly shorter. This applies to the thickness of the lens 2 chucked in the collet 1 before its subsequent processing. In this way, a seamless transition is made possible from the region 7 of the lens 2 to be processed to the upper edge region 6 of the gripping jaws 4. This avoids a deformation of the grinding or polishing tool at the transition from the region 7 to be processed of the lens 2 to the upper edge region 6 of the gripping jaws 4, which would lead to errors in processing the lens 2.

Preferably, the distance is less than the thickness of the lens 2 by an amount that corresponds to a material removal during the grinding and/or polishing. In other words, before the processing of the lens 2, the edge of the lens 2 chucked in the collet 1 is slightly higher than the adjacent edge of the upper edge region 6 of the gripping jaws 4. After processing of the lens 2, which is to say after the removal of material by the grinding and/or polishing of the lens 2 has taken place, the edge of the lens 2 and the adjacent edge of the upper edge region 6 of the gripping jaws 4 are then at the same height.

In useful fashion, the distance is less than the thickness of the lens 2 by an amount that corresponds to the material removal during the grinding and/or polishing that follows the chucking in the collet 1 and an additional center thickness tolerance, since the thickness of the lenses 2 is not identical, but can exhibit tolerances, i.e. these center thickness tolerances. In addition, this also permits, e.g., an additional processing step, for example a second polishing, in the event that a defect has arisen during the first processing step.

The contact surface 9 preferably is formed as an annulus in the receiving space for the lens 2 formed by the gripping jaws 4, advantageously along a bottom outer edge of the receiving space along an inner side of the gripping jaws 4. The back 10 of the lens 2 rests on this contact surface 9, so that the lens 2 is held flat in the collet 1. In useful manner in this design, the contact surface 9 is designed to correspond in such a manner to a region of the back 10 of the lens 2 resting on the contact surface 9 that the flat retention of the lens 2 in the collet 1 is ensured. The lens 2 is held centered in the collet 1 by means of the inner lateral bearing surface 14 of the gripping jaws 4 with which the gripping jaws 4 laterally contact the lens 2.

An inner region that is surrounded by the annular contact surface 9 is designed to be lower than the contact surface 9 so that the back 10 of the lens 2 does not touch the collet 1 in this inner region. In this way, damage to the lens 2 by the collet 1 is avoided, especially in a central, optically active area. Moreover, any dirt particles that may be present, such as grinding and polishing residues from preceding lens processing steps, can escape into this region so that they do not contaminate the contact surface 9 and thereby impair the optimal arrangement of the lens 2 in the collet 1, which is to say the flat resting of the lens 2 on the contact surface 9, and do not damage the back 10 of the lens 2.

The shank 3 has a shank recess 11 in the form of a groove on an outer surface in the transition region to the gripping jaws 4, which is to say at the top end. In the first and second embodiments of the collet 1, the gripping jaws 4 also have a gripping jaw recess 12 in the form of a groove on an outer surface in the transition region to the shank 3, which is to say on an underside and directly adjacent to the shank 3. Here, the two recesses 11, 12 in the form of grooves are connected to form a circumferential recess, as is especially evident in the detail views in FIGS. 5 and 12.

This recess permits, or the shank recess 11 and gripping jaw recess 12 permit, optimal insertion of the collet 1 in the hydraulic expansion chuck 8, wherein the collet 1 optimally rests against the hydraulic expansion chuck 8 with both the shank 3 and the underside of the gripping jaws 4, and is not hindered by the possible presence of dirt particles, for example grinding or polishing residues from previous lens processing. These dirt particles can escape into the shank recess 11 and gripping jaw recess 12, or into the common recess formed thereby, and do not hinder the insertion of the collet 1 in the hydraulic expansion chuck 8. In this way, exact clamping of the collet 1, and thereby exact chucking of the lens 2 in the collet 1, are made possible.

In the third embodiment of the collet 1, shown in FIGS. 13 through 15, a lens support 13 is formed that is centered in the receiving space for the lens 2. This embodiment is suitable for the lens 2 shown in FIG. 16, which has a concave back 10 opposite the region 7 to be processed, for example, and permits a support and flat retention of the lens 2 in the collet 1 in an alternative manner to the contact surface 9 of the above exemplary embodiments. The annular contact surface 9 at the edge is thus not necessary in this embodiment, since the lens 2 rests solely on the lens support 13.

A bearing surface of the lens support 13 is preferably designed to be rounded in order to avoid damage to the region of the lens 2 resting against this bearing surface. This is necessary in particular because the region of the lens 2 that rests against the bearing surface of the lens support 13 is a central and hence typically optically active region of the lens 2, which must not be damaged by contact with the collet 1, which is to say with the bearing surface of the lens support 13. The lens support 13, or its bearing surface, usefully is designed to correspond to a region of the back 10 of the lens 2 that rests against the bearing surface such that the flat retention of the lens 2 in the collet 1 is ensured. In a manner analogous to the contact surface 9, a height of the lens support 13 is designed such that the region 7 to be processed of the lens 2 is located above the upper edge region 6 of the collet 1, at least before the processing, and is accessible and to be processed by the grinding or polishing tool. In this third embodiment of the collet 1, the lens 2 is held centered by the inner lateral bearing surface 14 of the gripping jaws 4 with which the gripping jaws 4 laterally contact the lens 2, and is supported in the collet 1 and held flat in the collet 1 by the lens support 13.

In this third embodiment of the collet 1, shown in FIGS. 13 through 15, unlike the two other embodiments, the wall thickness of the bottom region of the shank 3 by which the shank segments are connected to one another is greater than the wall thickness of the shank parts separated from one another by the radial slots 5, since the bottom region of the shank 3 is connected to the lens support 13. In other words, the lens support 13 is attached to the shank 3 at the bottom, but is free-standing in a hollow interior space of the shank 3 in the upper part of the shank 3, so that the shank parts and the gripping jaws 4 have adequate free space to pivot inward due to clamping by the hydraulic expansion chuck 8 and so that the lens 2 can thus be chucked between the gripping jaws 4. In this case as well, the pivot axis, about which pivot the shank parts separated by the radial slots 5 and the gripping jaws 4 formed at the top ends thereof, is located in the region of the bottom ends of the radial slots 5. In order to better define the pivot axis and make the pivoting of the gripping jaws 4 more exact, a wall thickness of the shank parts can be reduced in the region of a bottom of the free space between the shank parts and the lens support 13, which is to say above the connection between the shank parts and the lens support 13, so that the pivot axis for the shank parts and the gripping jaws 4 is defined by this reduced wall thickness 15.

LIST OF REFERENCE CHARACTERS 1 collet
2 lens
3 shank
4 gripping jaws
5 slot
6 upper edge region
7 region to be processed
8 hydraulic expansion chuck
9 contact surface
10 back
11 shank recess
12 gripping jaw recess
13 lens support
14 bearing surface
15 reduced wall thickness

The invention claimed is:

1. Collet for holding a lens, comprising:
   a shank;
   at least two gripping jaws attached to an upper edge of the shank and separated from one another by radial slots, an upper edge region of the gripping jaws forming a contact surface for at least partially flexible grinding or polishing tool, the radial slots being continuous to an area adjacent to a lower edge of the shank; and
   a through hole formed between the upper edge of the gripping jaws and the lower edge of the shank,
   wherein the upper edge region of the gripping jaws is radially continuous with a region of the lens that is to be held by the collet, such that the upper region of the gripping jaws does not interfere with operation paths of the at least partially flexible grinding or polishing tool,
   wherein the gripping jaws includes a lens receiving section for receiving the lens, the lens receiving section having a sidewall portion that contacts a sidewall of the lens and a bottom outer edge that contacts a bottom outer edge of the lens and that is formed substantially perpendicularly to the sidewall portion,
   wherein a distance from the bottom outer edge to the upper edge region of the gripping jaws corresponds to a thickness of the lens at its edge, or is less than the thickness of the lens by an amount that corresponds to a material removal during the grinding and/or polishing that follows chucking in the collet, or corresponds to the material removal during the grinding and/or polishing that follows chucking in the collet and an additional center thickness tolerance, and
   wherein when the lens is held by the gripping jaws within the lens receiving section, the collet contacts the lens only at the sidewall portion and the bottom outer edge of the lens receiving section,
   wherein the shank is in a cylindrical form and has a cylindrical side surface having a first outer diameter, and
   wherein the gripping jaws includes an outer cylindrical wall portion having a second outer diameter that is greater than the first diameter, a tapered outer wall portion between the cylindrical wall portion and the upper edge region, and a lower outer surface that perpendicularly and radially inwardly extends from the cylindrical wall portion towards an axial direction of the collet and is connected to the cylindrical side surface of the shank at a transition region between the shank and the gripping jaws.

2. Collet according to claim 1, wherein the upper edge region is formed with an aspheric, conical, or spherical shape.

3. Collet according to claim 1, wherein the collet is made of metal.

4. Collet according to claim 3, wherein the collet is made of hardened steel.

5. Collet according to claim 1, wherein a wall thickness of the shank is made thinner at an end of the shank that is opposite from the gripping jaws than in the region of the radial slots.

6. Collet according to claim 1, wherein the shank has a shank recess in the form of a groove on an outer surface in the transition region to the gripping jaws.

7. Collet according to claim 1, wherein the gripping jaws have a gripping jaw recess in the form of a groove on an outer surface in the transition region to the shank.

8. Collet according to claim 1, wherein the lens receiving section further includes a stepped portion within an area surrounded by the bottom outer edge of the gripping jaws.

9. Collet for holding a lens, comprising:
   a shank; and
   at least two gripping jaws attached to an upper edge of the shank and separated from one another by radial slots, an upper edge region of the gripping jaws forming a contact surface for an at least partially flexible grinding or polishing tool, the radial slots being continuous to an area adjacent to a lower edge of the shank,
   wherein the upper edge region of the gripping jaws is radially continuous with a region of the lens that is to be held by the collet, such that the upper region of the gripping jaws does not interfere with operation paths of the at least partially flexible grinding or polishing tool,
   wherein a lens support with a cylindrical bearing surface with a rounded end forming a hollow space therein is formed inside an area surrounded by the gripping jaws and is centered in a lens receiving section for receiving the lens, the hollow space of the lens support extending between the rounded end and the lower edge of the shank, and
   wherein when the lens is held by the gripping jaws, the collet contacts the lens only at a sidewall portion of the lens receiving section and the rounded end of the cylindrical bearing surface,
   wherein the shank is in a cylindrical form and has a cylindrical side surface having a first outer diameter, and
   wherein the gripping jaws includes an outer cylindrical wall portion having a second outer diameter that is greater than the first diameter, a tapered outer wall portion between the cylindrical wall portion and the upper edge region, and a lower outer surface that perpendicularly and radially inwardly extends from the cylindrical wall portion towards an axial direction of the collet and is connected to the cylindrical side surface of the shank at a transition region between the shank and the gripping jaws.

10. Collet according to claim 9, wherein the upper edge region is formed with an aspheric, conical, or spherical shape.

11. Collet according to claim 9, wherein the collet is made of metal.

12. Collet according to claim 9, wherein the collet is made of hardened steel.

13. Collet according to claim 9, wherein a wall thickness of the shank is made thinner at an end of the shank that is opposite from the gripping jaws than in the region of the radial slots.

14. Collet according to claim 9, wherein the shank has a shank recess in the form of a groove on an outer surface in the transition region to the gripping jaws.

15. Collet according to claim 9, wherein the gripping jaws have a gripping jaw recess in the form of a groove on an outer surface in the transition region to the shank.

16. Collet according to claim 9, wherein the rounded end of the cylindrical bearing surface is aligned with an upper edge of the gripping jaws in the axial direction of the collet.

17. Collet according to claim 9, wherein the lens receiving section further includes a bottom outer edge, and
wherein the rounded end of the cylindrical bearing surface is disposed closer to an upper edge of the gripping jaws in the axial direction of the collet than the bottom outer edge of the lens receiving section.

\* \* \* \* \*